US008112750B2

(12) United States Patent
Hayakawa et al.

(10) Patent No.: US 8,112,750 B2
(45) Date of Patent: Feb. 7, 2012

(54) COMPUTER SYSTEM

(75) Inventors: Norimitsu Hayakawa, Inagi (JP);
Shuhei Matsumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1049 days.

(21) Appl. No.: 12/019,952

(22) Filed: Jan. 25, 2008

(65) Prior Publication Data

US 2008/0189701 A1 Aug. 7, 2008

(30) Foreign Application Priority Data

Jan. 29, 2007 (JP) .................. 2007-017659

(51) Int. Cl.
*G06F 9/455* (2006.01)
*G06F 9/46* (2006.01)
(52) U.S. Cl. .......................... 718/1; 718/100
(58) Field of Classification Search ............... 718/1, 100
See application file for complete search history.

(56) References Cited

U.S. PATENT DOCUMENTS

| 7,051,188 | B1 * | 5/2006 | Kubala et al. ............... 712/29 |
| 7,512,753 | B2 | 3/2009 | Aigo | |
| 7,707,578 | B1 * | 4/2010 | Zedlewski et al. ........... 718/102 |
| 2002/0052909 | A1 * | 5/2002 | Seeds ............................. 709/104 |
| 2007/0055830 | A1 * | 3/2007 | Brenner ......................... 711/153 |
| 2007/0079102 | A1 * | 4/2007 | Armstrong et al. ........... 711/173 |
| 2007/0169127 | A1 * | 7/2007 | Kashyap ....................... 718/104 |

FOREIGN PATENT DOCUMENTS

| JP | 8-77025 A | 3/1996 |
| JP | 2004-252526 A | 9/2004 |
| JP | 2006-244483 | 9/2006 |
| WO | 2005/036367 A2 | 4/2005 |

OTHER PUBLICATIONS

Performance Reporter for OS/390 CICS Performance Feature Guide and Reference, Tivoli, Release 5, Nov. 2000,13 pp., Japan.

* cited by examiner

*Primary Examiner* — Thomas Lee
*Assistant Examiner* — Samantha Hoang
(74) *Attorney, Agent, or Firm* — Mattingly & Malur, PC

(57) ABSTRACT

In scheduling shared processing that has a higher priority than LPAR processing, giving precedence to physical CPUs running idle LPARs prevents prolonged hold-up of LPAR processing. In a system is comprised of multiple physical CPUs, multiple LPARs to which these physical CPUs are allocated and which execute programs under their guest OSes, and a management program managing these LPARs, a few additional units are introduced: a guest OS monitoring unit that can grasp the states of guest OSes running on these LPARs and a dispatcher unit that allocates one of these physical CPUs to shared processing requested by the management program, which has a higher priority than LPAR processing. When a request for shared processing arises, the dispatcher unit interrogates the guest OS monitoring unit and, based on the information obtained from it, gives priority of allocation to the physical CPU processing an idle LPAR.

6 Claims, 9 Drawing Sheets

COMPUTER SYSTEM

BACKGROUND OF THE INVENTION

1. Field of the Invention

The present invention relates generally to computer systems, and in particular, to the scheduling of shared processing in a computer system whose physical resources are split into a plurality of logical partitions (hereinafter abbreviated to "LPARs").

2. Description of the Related Art

In recent years, a scheme called "server partitioning" has been put to practical use, whereby the hardware resources of a high-performance computer system are partitioned into a number of parts called LPARs, each of which in turn serves as a server. Server partitioning is classified into two types depending on the operating environments of the LPARs: hypervisor type and host operating system (hereinafter abbreviated to OS) type. In a hypervisor type environment, LPARs are operated under a special management program called a hypervisor that resides on the bare machine. In a host OS type environment, LPARs are operated under a management program that runs as an application under an ordinary OS (host OS). In either case, the key elements of server partitioning are a control mechanism called Virtual Machine Monitor (VMM) and a number of LPARs operated under it. An LPAR is also called a "virtual machine"; the OS operating on it is called the "guest OS." In terms of function, the guest OS operates in the same manner on the LPAR as it does on an ordinary server which is not partitioned.

The hypervisor primarily carries out instruction emulation, memory management, I/O processing, and scheduling. Since several LPARs may share some of the resources of the hosts, the hypervisor includes the function of "shared processing," which is demanded by all the LPARs from time to time. In general, this processing should be given a higher priority than the processing of individual LPARs. Unfortunately, shared processing may, if no CPU is allocated to it, take up the entire CPU resources allocated to an LPAR, thereby holding up all the processing on that LPAR.

There exist several known schemes that are designed to solve such a problem, namely the problem where certain processing prevents physical CPU resources from being allocated to other processing. An example is time-sharing, which is a scheduling algorithm designed to guarantee impartial treatment of various pieces of processing. Time-sharing allows physical CPUs to be allocated to each individual piece of processing, without holding up shared processing for an extended period of time. With time-sharing, however, it is impossible to determine whether the physical CPU that is given resources is one that is processing an LPAR in busy state or one that is processing an LPAR that is internally in idle state.

On the other hand, as a scheme for preventing prolonged hold-up of the processing of certain jobs, a "job class" method is known, which allocates resources based on priority. This method predefines a priority scheme consisting of multiple levels called job classes; each piece of processing is assigned one of the job classes when executed. This approach thus realizes priority-based allocation of CPU resources.

The job class method, however, is effective only within a closed environment inside one computer (OS); it is difficult to apply this method to an environment encompassing multiple LPARs and a hypervisor. The reason is that whereas the hypervisor statically treats all the LPARs equally with the same priority level, the internal state of each LPAR dynamically switches from "busy" to "idle" and vice versa.

Further, Japanese Unexamined Patent Application Publication No. 2006-244483 discloses a method for detecting processes that consume large amounts of CPU resources and allocating them to an "isolated LPAR" for which allocation of less resources is defined than for other LPARs, thereby preventing these other LPARs from being impacted. This scheme, however, cannot be applied to shared processing requested by the hypervisor, which should be given a higher priority during execution than the processing of LPARs.

SUMMARY OF THE INVENTION

Figure 1:
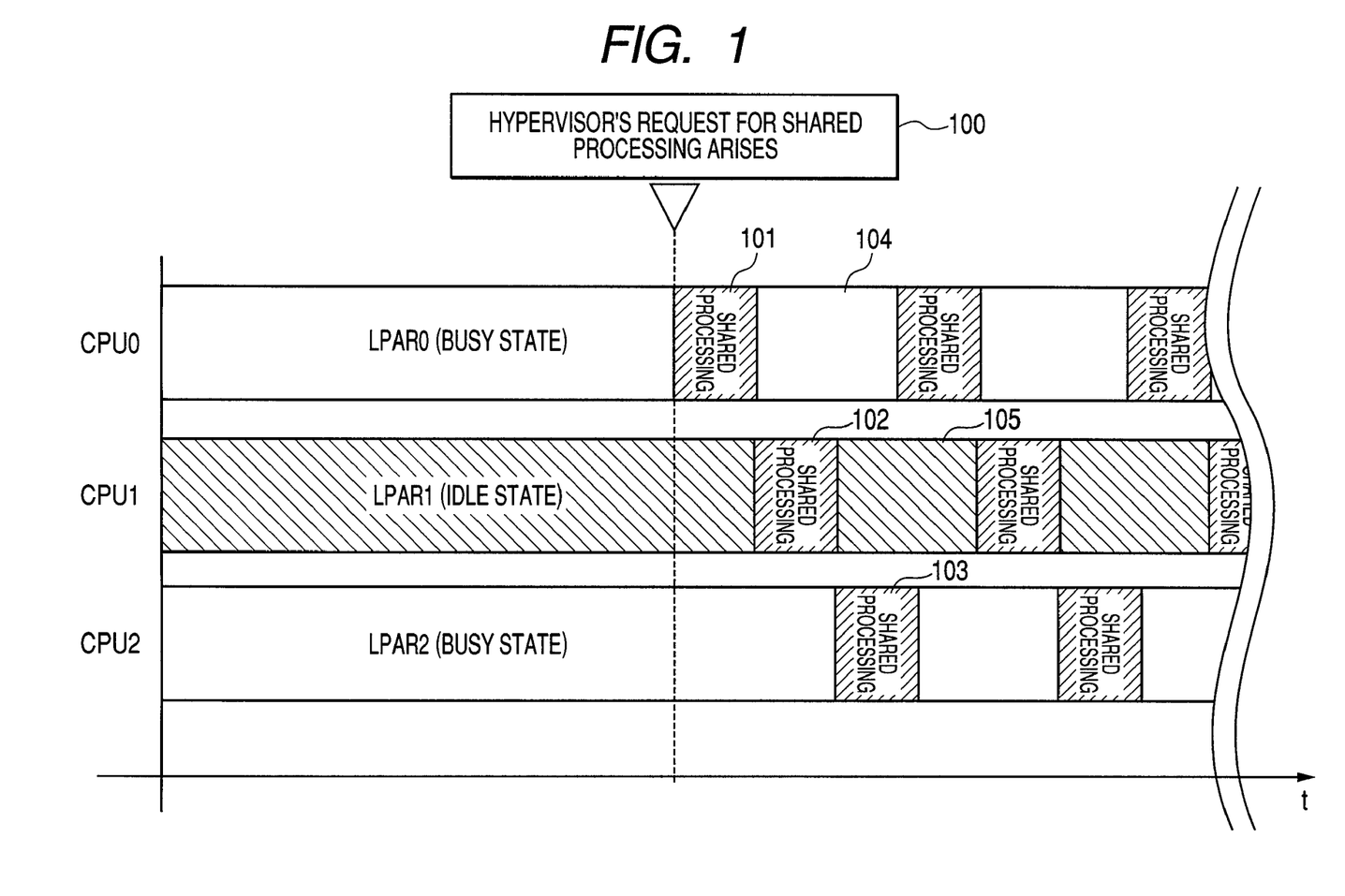
FIG. 1 is a diagram explaining how shared processing is dispatched in a time-sharing system.
Figure 2:
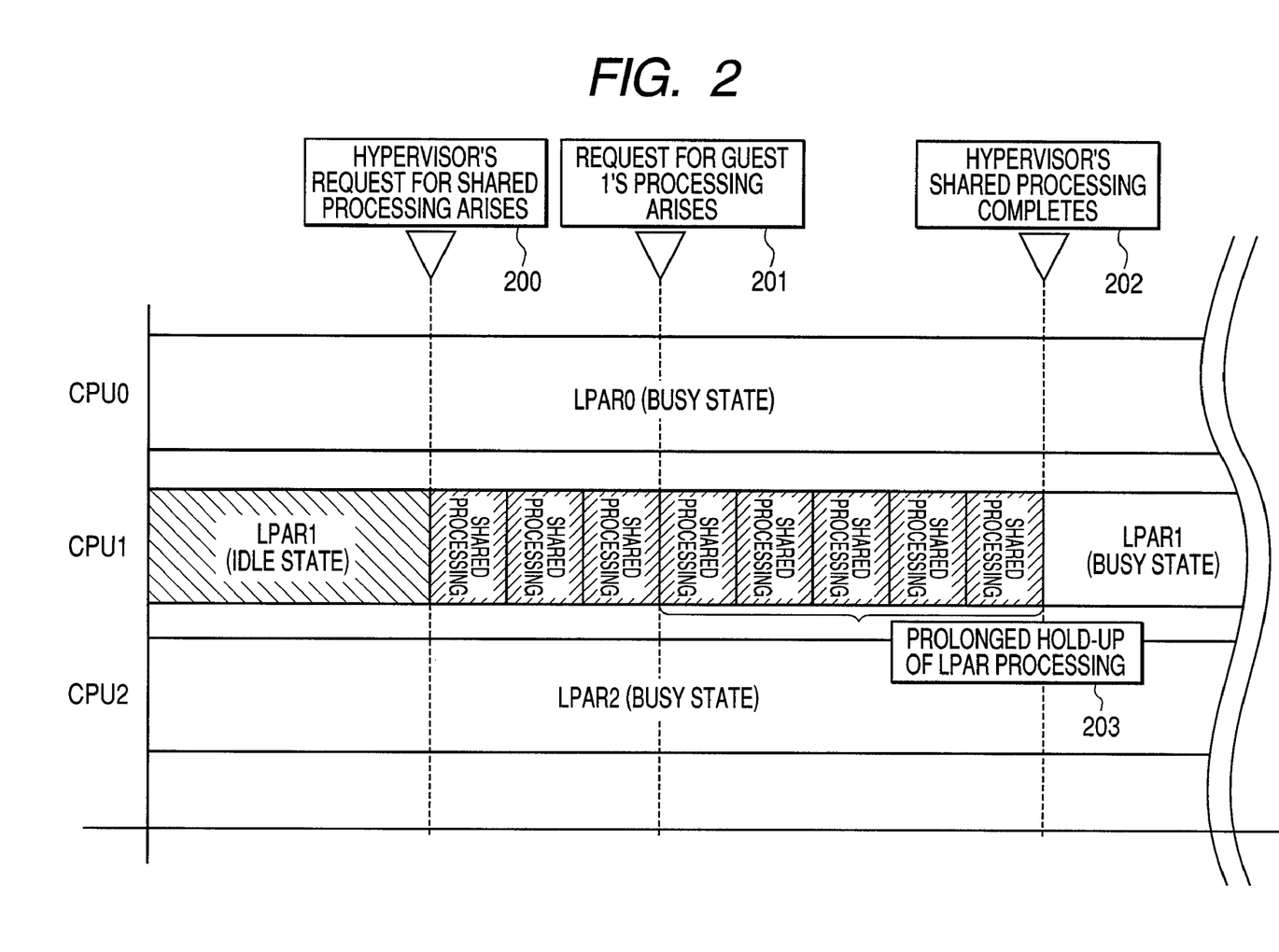
FIG. 2 is a diagram explaining how shared processing with a higher priority holds up the processing of a particular LPAR.
Figure 3:
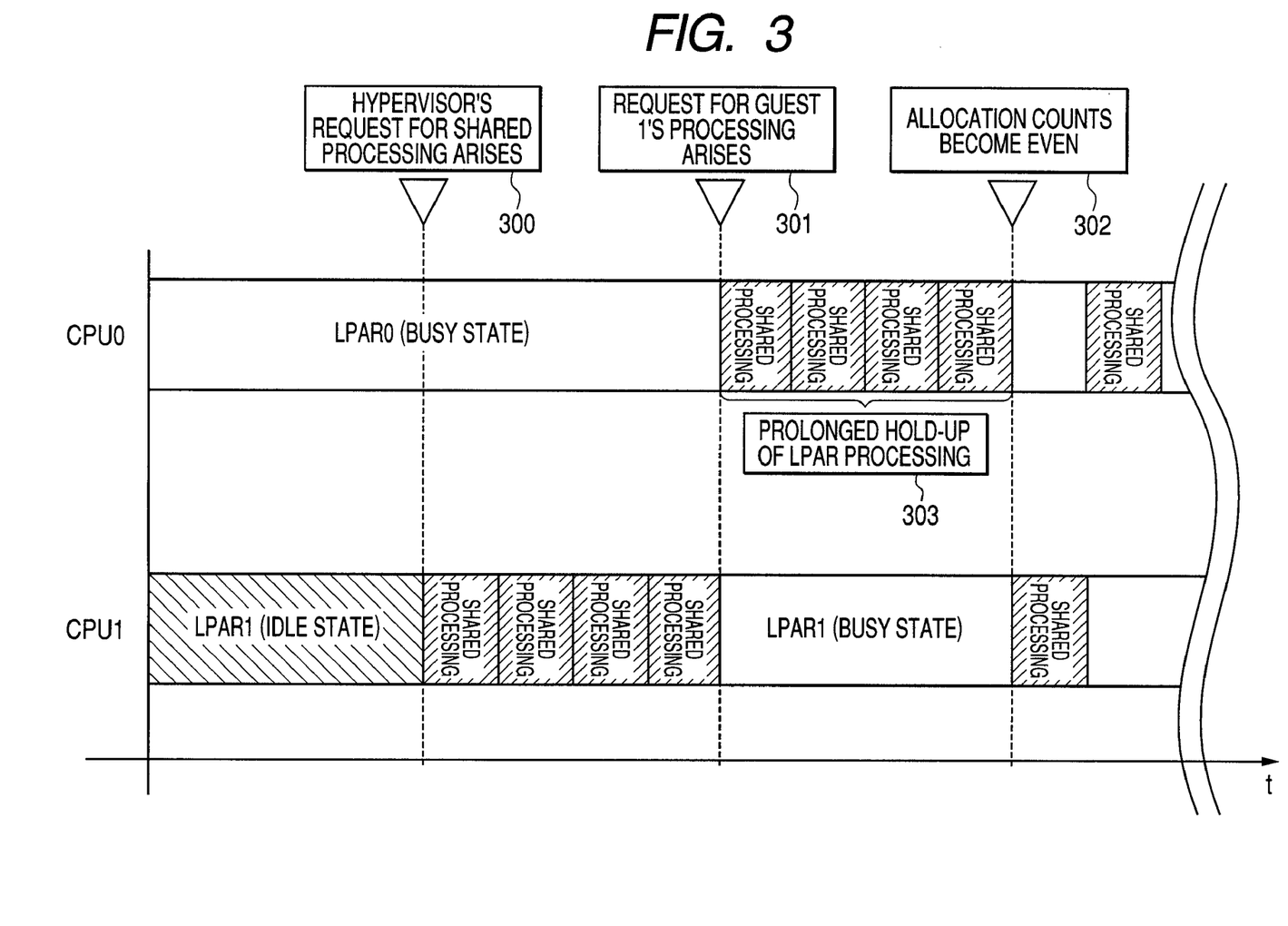
FIG. 3 is a diagram explaining how uniform allocation causes prolonged hold-up of the processing of a particular LPAR.

A more detailed description of the problem to be solved by the invention is due, with reference to FIGS. 1 through 3. FIG. 1 illustrates the way in which shared processing is dispatched in a time-sharing system. Three physical CPUs are allocated to three LPARs in a dedicated manner, namely, CPU0 to LPAR0, CPU1 to LPAR1, and CPU2 to LPAR2. The guest OSes running on LPAR0 and LPAR2 are always in busy state, whereas the guest OS running on LPAR1 is in idle state.

When a request for shared processing arises at a certain point in time 100, it is dispatched piecemeal to the three physical CPUs (in other words, the three physical CPUs are allocated to it one after another) as indicated by the three time slices 101-103. Since the load of shared processing is borne by the three physical CPUs in a time-shared manner, the prolonged hold-up of the processing of a particular LPAR is prevented.

This arrangement, however, has a disadvantage that, assuming equal priority among all the LPARs, all the physical CPUs are uniformly deprived of resources, regardless of the states (busy or idle) of the guest OSes running on them. For example, physical CPU0, which is kept busy processing an LPAR even without the allocated load of shared processing as indicated by a time slice 104, is deprived of its resources for that load, while there is a physical CPU that processes an LPAR in idle state as indicated by another time slice 105.

FIG. 2 illustrates a solution to the above-mentioned problem, which, instead of using a time-sharing method, allocates, to shared processing, multiple physical CPUs in a distributed manner, based on the detection of LPARs in idle state and the number of allocations, or dispatches, each physical CPU has been given. When a request from the hypervisor for shared processing arises at a certain point in time 200, a physical CPU processing an LPAR in idle state is allocated to it. However, when a request for processing arises in the guest OS or an application on that LPAR at a later point in time 201, it is held pending until a point in time 202 when the shared processing on that LPAR completes, because the latter is given a higher priority than the former. Thus, this method is also not free from the possibility that the guest OS on one of the LPARs is held up for an extended period of time, as indicated by 203.

As shown in FIG. 3, this problem can be solved by introducing a certain modification such that physical CPU1, whose guest OS is allocated to LPAR1 that is in idle state, moves from idle state to busy state at a point in time 301 when it has completed the execution of multiple pieces of processing that originated at a point in time 300. As a result, shared processing is considered to have been quickly carried over to one of the physical CPUs that are processing busy LPARs.

The count-based scheduling method as described above, however, is also not free from the possibility that although load is generally balanced on the whole, a large amount of load of shared processing is put on one of the physical CPUs processing LPARs. In such a case, shared processing remains put on one physical CPU until load balancing is achieved at a point in time 302, and the LPAR running on this physical CPU is held up for an extended period of time. This problem happens because after the physical CPU processing an LPAR in idle state moves into busy state, no processing is assigned to that physical CPU in consideration of maintaining load balancing, since the accumulated count for that physical CPU is high.

It is a general object of the invention to provide a computer system that prevents prolonged hold-up of the processing of LPARs because of shared processing. It is a more specific object of the invention to provide a system for efficiently scheduling shared processing that has a higher priority than LPAR processing, by preventing prolonged hold-up of the processing of LPARs in busy state through effective use of CPUs allocated to LPARs in idle state.

The computer system according to the present invention is preferably configured as a computer system composed of a plurality of physical CPUs, a plurality of LPARs to each of which one of these physical CPUs is allocated and which execute programs under the guest OSes running on them, a management program that manages these LPARs, a guest OS monitoring unit capable of grasping the states of the guest OSes running on these LPARs, and a dispatcher unit that allocates one of these physical CPUs to the management program's shared processing that has a higher priority than LPAR processing, all configured so that the dispatcher unit gives priority, based on the information obtained from the guest OS monitoring unit, to the physical CPUs processing LPARs in idle state in dispatching shared processing.

A preferred embodiment of the present invention is a computer system equipped with a set of dispatch priority tables that manage priority assignment among the management program's shared processing and all other processing, so configured that the dispatch priority tables are updated upon completion of execution of a certain number of pieces of shared processing.

Another preferred embodiment of the present invention is a computer system of a similar composition further equipped with a table updating unit that updates the contents of the dispatch priority tables, so configured that the table updating unit gives shared processing a higher priority, at the initial point, than the processing of LPARs in idle state and later gives it a lower priority upon completion of execution of a certain number of pieces of shared processing. Thus, shared processing, which ordinarily has a higher priority, is prevented from monopolizing a particular physical CPU and, as a result, the processing of an LPAR by that physical CPU is prevented from being held up for an extended period of time.

A further preferred embodiment of the present invention is a computer system of a similar composition further equipped with a counter belonging to the dispatcher unit that manages the number of times each physical CPU is allocated to shared processing. Each time a decision is to be made on whether or not to update the value of the counter, the dispatcher unit obtains, from the guest OS monitoring unit, the state of the LPAR running on the physical CPU which has been allocated to shared processing and, if that LPAR is in idle state, does not update the value of the counter. In a still further preferred embodiment of the present invention, at least one of the plurality of LPARs is set aside as one that primarily executes shared processing. When a request for shared processing arises, the dispatcher unit gives priority of allocation to the physical CPU processing the LPAR thus set aside or an LPAR in idle state.

A preferred embodiment of the present invention also relates to a scheduling method involving a hypervisor that allocates a plurality of physical CPUs to a plurality of LPARs and that manages the scheduling of shared processing which pertains to all the LPARs. In particular, the scheduling method monitors, using the guest OS monitoring unit, the states of the guest OSes running on the LPARs and when a request for shared processing arises, gives priority of allocation, based on the information obtained from the guest OS monitoring unit, to the physical CPU(s) processing an LPAR or LPARs in idle state.

As described above, in a system composed of a plurality of physical CPUs and a plurality of LPARs to which they are allocated, the present invention allows, in allocating resources to shared processing, the effective use of physical CPUs allocated to LPARs in idle state. Further, even if there are no LPARs in idle state, it achieves balanced scheduling, by equally utilizing the physical CPUs allocated to all the LPARs, so that preference is given to shared processing with a higher priority than LPARs, while preventing prolonged hold-up of the processing of a particular LPAR.

DESCRIPTION OF THE PREFERRED EMBODIMENTS

Referring now to the drawings, preferred embodiments are described herein.

Embodiment 1

Figure 4:
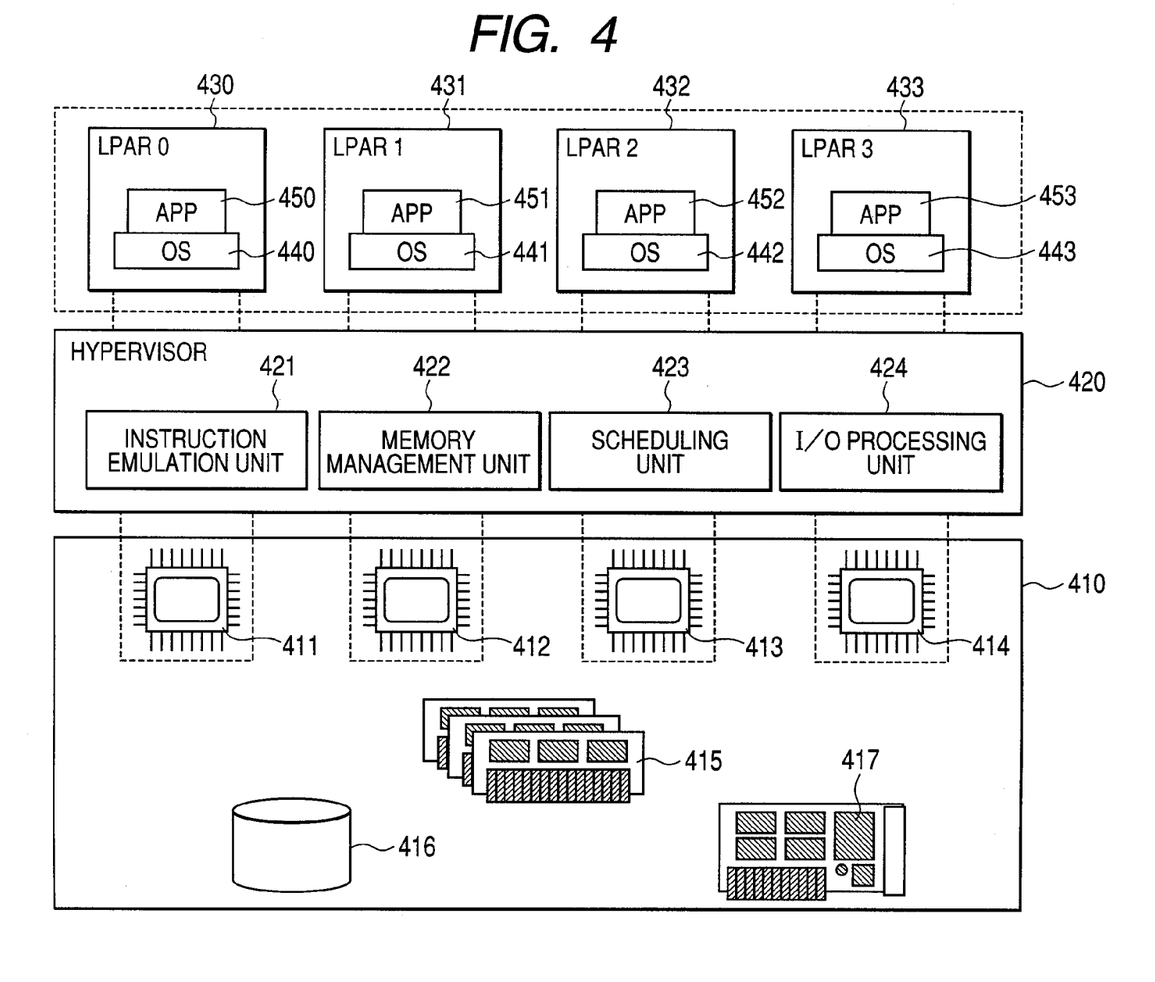
FIG. 4 is an exemplary diagram showing the configuration of a computer system according to an implementation consistent with the principles of the invention.

FIG. 4 is an exemplary diagram showing the configuration of a computer system according to an embodiment of the invention.

Server partitioning is applied to this computer system, which comprises four physical CPUs 411-414 (generically numbered 41), so that they are allocated to four LPARs 430-433 (generically numbered 43). There is a Hypervisor 420 managing the LPARs, which is run on a plurality of physical CPUs in a collaborative manner instead of a single physical CPU in a dedicated manner (there are no hidden CPUs). The I/O processing that pertains to the devices shared in the system constitutes shared processing.

A set of physical (hardware) resources 410 of the system includes a plurality of physical CPUs 411-414, a main storage 415, an external storage 416, and a network interface card 417.

The Hypervisor 420 operates using the hardware resources 410 and manages and controls a plurality of LPARs 430-433 that run on them. In terms of function, the Hypervisor 420 comprises an Instruction Emulation Unit 421, a Memory Management Unit 422, a Scheduling Unit 423, and an I/O Processing Unit 424.

The LPARs 43 comprise guest OSes 440-443 (generically numbered 44) and application programs 450-453 (generically numbered 45) that run under them. The application programs operate in this configuration in the same manner as on hardware to which server partitioning is not applied.

Figure 5:
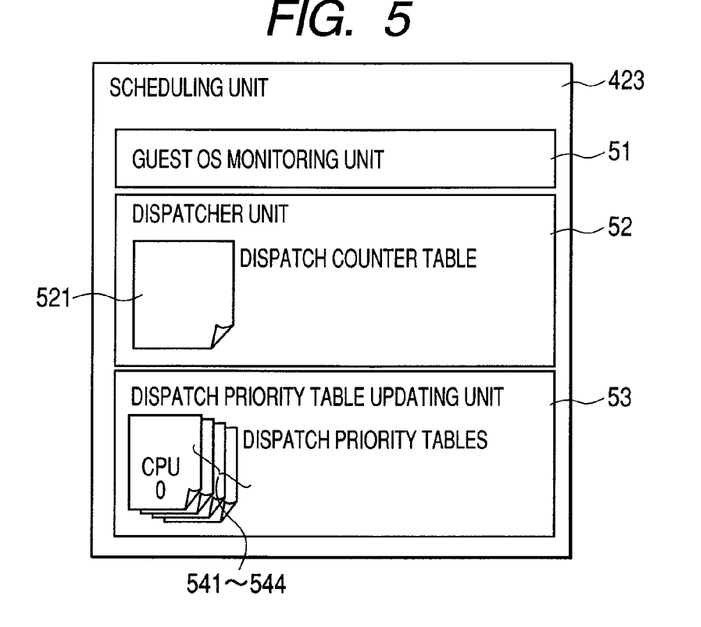
FIG. 5 shows the configuration of the Scheduling Unit 423 contained in FIG. 4.

FIG. 5 shows the configuration of the Scheduling Unit 423, which comprises a Guest OS Monitoring Unit 51, a Dispatcher Unit 52, and a Dispatch Priority Table Updating Unit 53. The Guest OS Monitoring Unit 51 monitors and grasps not only shared processing but also, in a real-time manner, the states of the OSes running on the LPARs 43 and of the LPARs that execute shared processing.

The Dispatcher Unit 52 allocates C-PU resources to the Hypervisor 420 and the LPARs 43, using a scheduling algorithm. The Dispatcher Unit 52 is equipped with a Dispatch Counter Table 521. To maintain a balance of load in allocating the physical CPUs 41 to the LPARs 43, the Dispatcher Unit 52 counts the number of times each one of the physical CPUs 41 is allocated to shared processing, and keeps all such counts in the Dispatch Counter Table 521. In allocating a physical CPU, it chooses the one with the least count; for example, if the Dispatch Counter Table 521 holds the values "2," "3," "4," and "1" for the physical CPUs 411 through 414, respectively, the Dispatcher Unit 52 chooses the physical CPU 414, which has the smallest value of "1," as the physical CPU to be allocated next to shared processing.

The Dispatch Priority Table Updating Unit 53 is equipped with Dispatch Priority Tables 541 through 544 (generically numbered 54) corresponding to the physical CPUs 411 through 414, respectively, so as to dynamically manage the priority of allocation.

Figure 6:
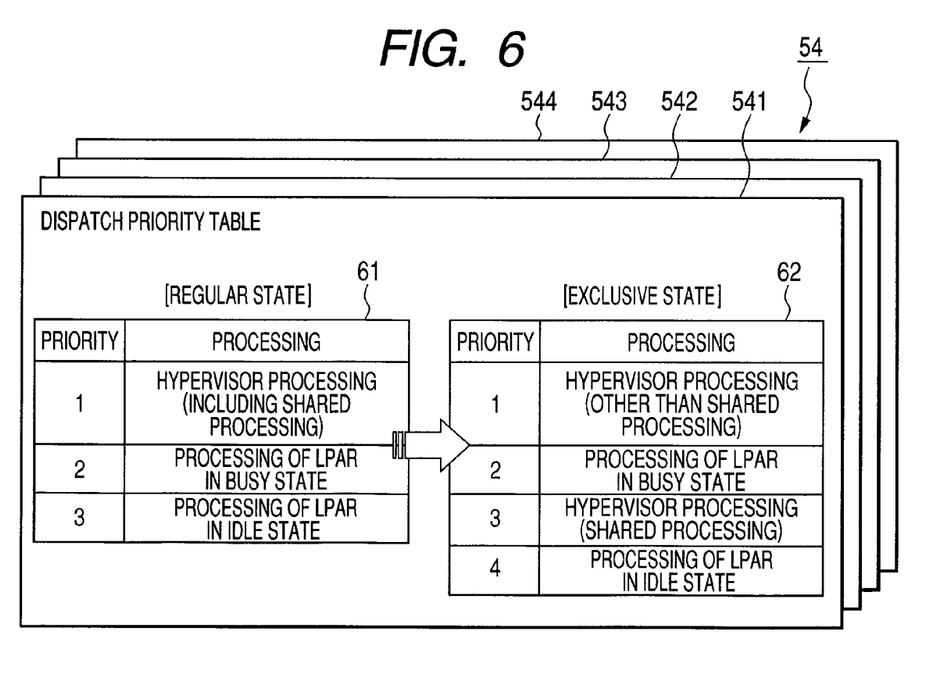
FIG. 6 shows the configuration of the Dispatch Priority Tables 54.

As shown in FIG. 6, the Dispatch Priority Tables 54 hold the priority levels assigned to various types of processing such as Hypervisor processing (for example, shared processing), processing of an LPAR in busy state, and processing of an LPAR in idle state. Each of the Dispatch Priority Tables 54 has two states: a regular state 61 and an exclusive state 62. Initially, the regular state 61 is assumed. In regular state 61, Hypervisor processing, including shared processing, is given the highest priority so that it takes precedence over processing of LPARs.

In order to prevent shared processing from holding up processing of LPARs for an extended period of time, the Dispatcher Unit 52 changes, upon completion of a series of pieces of shared processing on any of the physical CPUs 411 through 414, the state of the Dispatch Priority Table 54n (any of 511 through 514 as appropriate) for that physical CPU from regular 61 to exclusive 62, by lowering its priority for shared processing. The physical CPU that has thus been moved into the exclusive state 62 releases its CPU resources if there exists LPAR processing with a higher priority than shared processing. As a result, a physical CPU can be allocated to LPAR processing, which prevents a prolonged hold-up of LPAR processing. Thereafter, upon completion of LPAR processing, the Scheduling Unit 423 puts the contents of the Dispatch Priority Table corresponding to that physical CPU back to the original values, thereby placing it in regular state.

Figure 7:
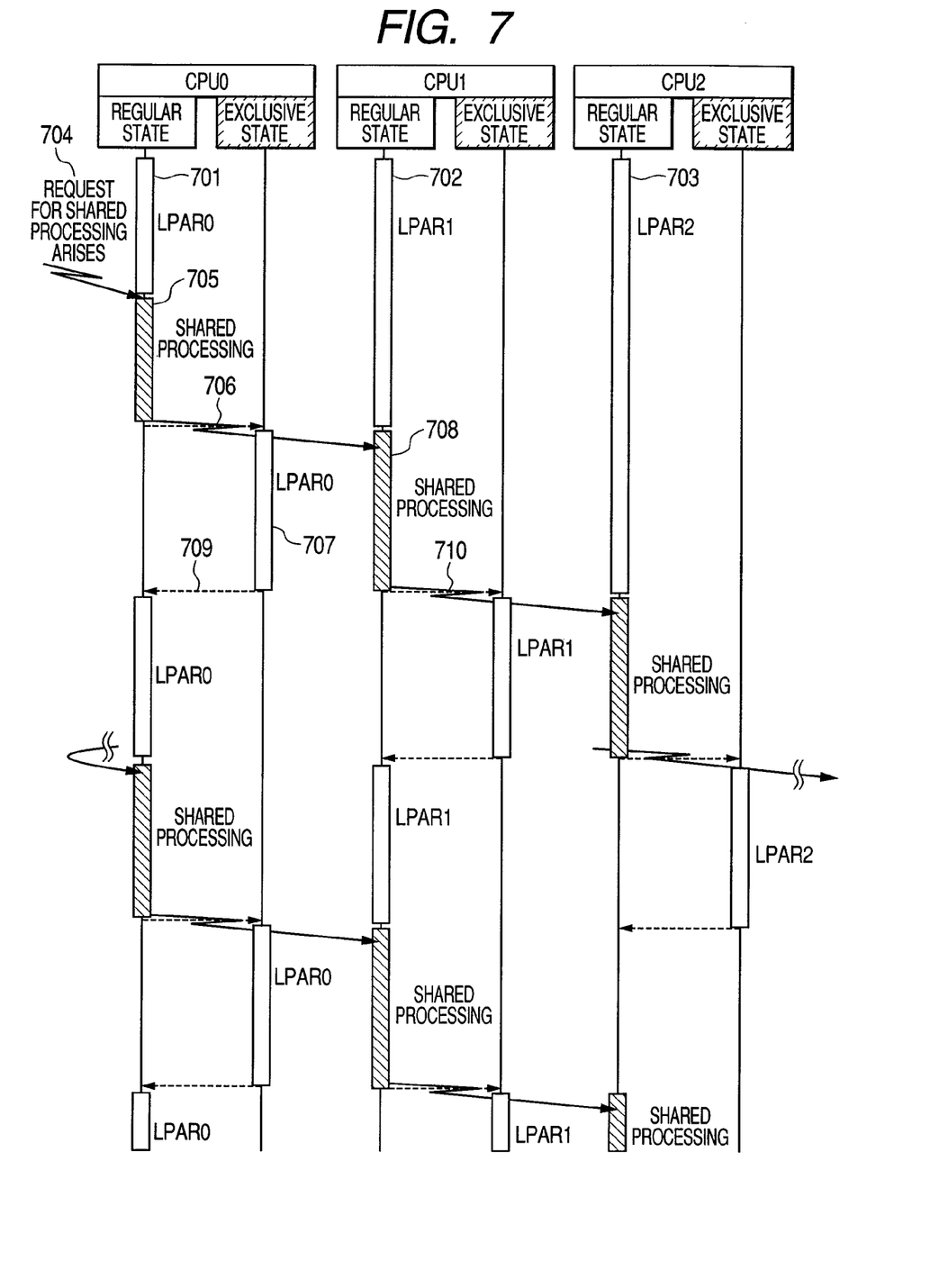
FIG. 7 illustrates the processing sequence of the Dispatch Table Updating Unit 53 contained in FIG. 5.

FIG. 7 illustrates the sequence of updating the Dispatch Priority Tables 54. In the description of the embodiments of the invention contained hereinafter, the mnemonic names "physical CPU0," "physical CPU1," "physical CPU2," and "physical CPU3" are each used to represent any of the physical CPUs 411 through 414. Similarly, the mnemonic names "LPAR0," "LPAR1," "LPAR2," and "LPAR3" are each used to represent any of the LPARs 430 through 433. It should also be noted that whereas FIG. 7 shows a case with only three physical CPUs, namely CPU0, CPU1, and CPU2, it is not intended to limit the number of physical CPUs to three. Operation of computer systems consisting of more than three physical CPUs is essentially the same.

At the initial point, all the physical CPUs (CPU0 through CPU2) are in regular state (701 through 703, respectively). When a request for shared processing arises in the Hypervisor (704), a physical CPU (CPU0 in this case) is allocated to it immediately (705) since shared processing has the highest priority on all the physical CPUs because they are all in regular state. Upon completion of the series of pieces of shared processing given for the time slice, the physical CPU (CPU0) that has been executing it is switched to exclusive state (706). In the allocation of a physical CPU in exclusive state, LPAR processing (in this case processing of LPAR0) takes precedence of shared processing (707).

At this point, CPU1 is allocated to shared processing, which has a higher priority than the processing of LPAR1 because CPU1 is in regular state (708); as a result, shared processing is carried over without interruption. Upon completion of the series of pieces of shared processing given for the time slice, CPU1, which has been executing it, is switched to exclusive state (710), whereas CPU0, which has been in exclusive state, is put back to regular state (709). In this manner, shared processing is carried over from one physical CPU to another among a group of physical CPUs executing the processing of LPARs.

Figure 8:
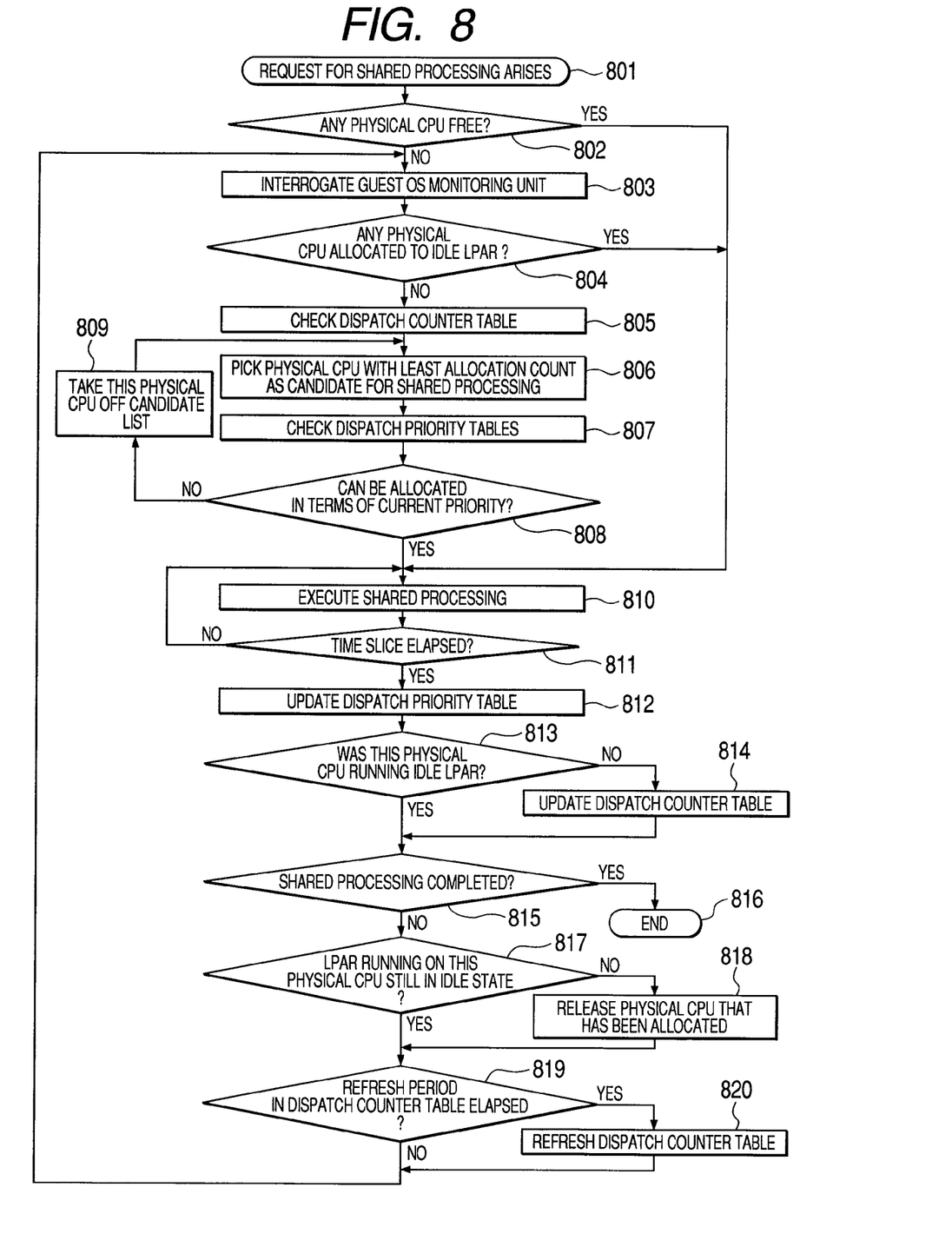
FIG. 8 is a flowchart showing the scheduling in a computer system according to an implementation consistent with the principles of the invention.

FIG. 8 is a flowchart showing the processing sequence for the Scheduling Unit 423. When a request for shared processing arises (step 801), the Scheduling Unit 423 checks to see if there are any free physical CPUs that are not allocated to an LPAR (step 802). If there is one, the Scheduling Unit 423 allocates it; if there are none, the Scheduling Unit 423 interrogates the Guest OS Monitoring Unit 52 (step 803) to see if there are any physical CPUs that are allocated to LPARs in idle state (step 804). If there is one, the Scheduling Unit 423 allocates it; if there are none, the Scheduling Unit 423 checks the Dispatch Counter Table 521 (step 805) and picks, as a candidate for allocation to shared processing, the physical CPU with the least allocation count, i.e., the smallest number of times it has been allocated (step 806).

Before making the selection final, the Scheduling Unit 423 interrogates the Dispatch Priority Tables 54 (step 807) to see if, judging from the current priority status, it is possible to allocate the selected physical CPU to shared processing (step 808). If the selected physical CPU is in exclusive state and hence cannot be allocated, the Scheduling Unit 423 takes it off the candidate list (step 809) and checks again the Dispatch Counter Table 521. If the selected physical CPU can indeed be allocated, the Scheduling Unit 423 finally allocates it to shared processing (step 810).

Shared processing is executed for a predetermined duration of time called a "time slice" (step 811) at a time. After the lapse of the time slice during the execution of shared processing, the Scheduling Unit 423 updates the Dispatch Priority Table 54n corresponding to the physical CPU that has been executing shared processing (step 812). It also interrogates the Guest OS Monitoring Unit 51 to find out whether the physical CPU that has been executing the shared processing was running an LPAR in idle state at the start of the time slice (step 813). If this physical CPU was indeed running an LPAR in idle state at the start of the time slice (step 813Y), the Scheduling Unit 423 does not update the Dispatch Counter Table 521. If this physical CPU was running an LPAR in busy state (step 813N), it updates the Dispatch Counter Table 521 (step 814).

Subsequently, the Scheduling Unit 423 checks whether shared processing has been completed (step 815), and if so, terminates the scheduling process (step 816). If shared processing has not been completed, it proceeds to determine the suitability of continuing to use the current physical CPU for shared processing for the next time slice, by checking whether the LPAR to which the current physical CPU is allocated is still in idle state (step 817). If it is still in idle state, the Scheduling Unit 423 is going to use the same physical CPU; if it has come out of idle state in the meantime and is now in busy state, the Scheduling Unit 423 releases this physical CPU (step 818). The Scheduling Unit 423 then proceeds to interrogate the Dispatch Counter Table 521 to see if a predetermined length of refreshing interval, at which it is regularly refreshed (step 820), has elapsed (step 819), and if the length of refreshing interval has not elapsed, goes back to step 803 to repeat the foregoing process.

Figure 9:
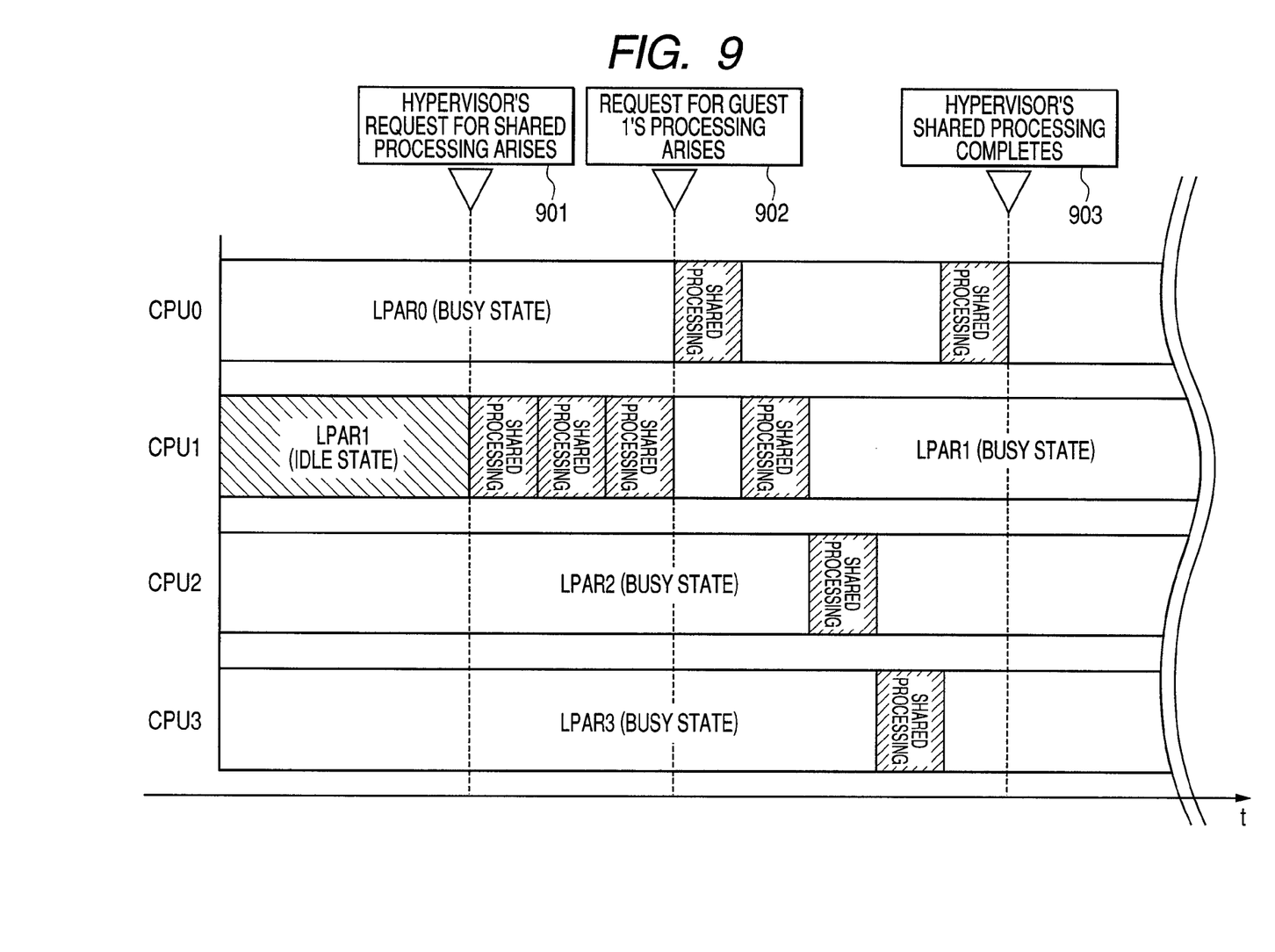
FIG. 9 shows how scheduling is managed in accordance with an embodiment of the invention.

FIG. 9 illustrates an example of how shared processing is scheduled. The mnemonic names "OS0," "OS1," "OS2," and "OS3" represent the guest OSes running on LPAR0, LPAR1, LPAR2, and LPAR3, respectively. At the initial point, OS1 is in idle state. When, at a certain point in time 901, a request for shared processing arises, it is dispatched to physical CPU1 that is processing LPAR1. As long as OS1 (running on physical CPU1) is in idle state, shared processing is executed on physical CPU1 with a view to making the most of it, while the other OSes, i.e., OS0, OS2, and OS3 concentrate on LPAR processing without being bothered by shared processing. If a request for processing on OS1 arises at a later point in time 902, the physical CPU1 is released at the next timing for scheduling and is put in the state of processing LPAR1, to which it is originally allocated. In this manner, the Scheduling Unit 423 ensures, by allocating all the physical CPUs uniformly, that shared processing is brought to completion without using any particular physical CPU exclusively (903).

Embodiment 2

Figure 10:
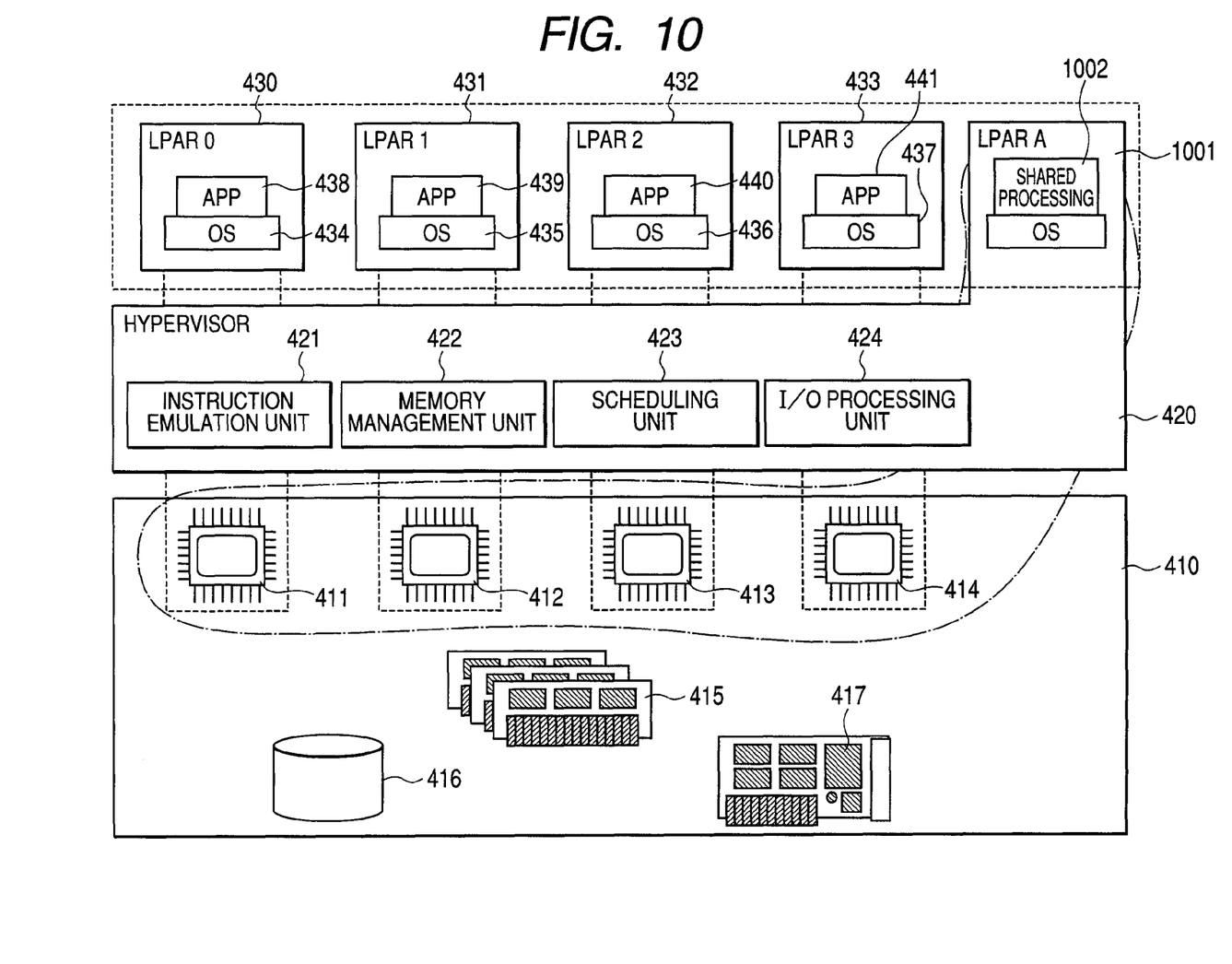
FIG. 10 is an exemplary diagram showing the configuration of a computer system according to another embodiment of the invention.

FIG. 10 is an exemplary diagram showing the configuration of a computer system according to another embodiment of the invention. According to this embodiment, shared processing, which in this case is I/O processing requested by any of the guest OSes, is not executed by any of the LPARs on which guest OSes run. Instead, a dedicated LPAR 1001, designated as LPARA in FIG. 10, is provided upon which the driver OS for executing I/O processing for all the LPARs runs. This configuration allows more than one I/O device to be shared by a plurality of LPARs, thereby increasing the efficiency of I/O processing, especially by introducing an intermediary buffer area. Since the driver OS executes more than one instance of I/O processing 1002, it is generally necessary to allocate a physical CPU longer than in ordinary instruction processing. The configuration according to this embodiment, however, allows shared processing to be executed even in such situations without holding up the resources of any particular one of the physical CPUs running LPARs 430 through 433 for an extensive period of time, while keeping the priority of the driver OS (which runs on a particular LPAR) high.

Although only two embodiments of the invention have been disclosed and described, it is apparent that various modifications may be made without departing from the spirit and scope of the invention. Accordingly, it is to be understood that the invention is not to be limited by the specific illustrated embodiments but only by the scope of the appended claims.

What is claimed is:

1. A computer system comprising:
   a plurality of physical CPUs;
   a plurality of LPARs to each of which any of said physical CPUs is allocated and which execute programs under their corresponding quest OSes;
   management means that manages a plurality of said LPARs;
   a quest OS monitoring unit capable of grasping the states of the quest OSes running on said LPARs;
   a dispatcher unit that allocates one of said physical CPUs to shared processing requested by said management means having a higher priority than the processing of said LPARs,
   wherein said dispatcher unit checks the results of monitoring conducted by said guest OS monitoring unit and, based on the results, gives priority of allocation to the one of said physical CPUs that runs one of said LPARs in idle state;
   a set of dispatch priority tables corresponding to said physical CPUs that manage priority among shared processing requested by said management means and processing other than the shared processing, wherein, upon completion of execution of a part of the shared processing, the contents of the member of said set of dispatch priority tables corresponding to the one of said physical CPUs upon which said part of the shared processing has been executed are updated; and
   a table updating unit that updates the contents of said set of dispatch priority tables, wherein, upon completion of execution of a part of the shared processing, said table updating unit temporarily lowers the priority of the shared processing below that of the LPARs in idle state, thereby preventing the shared processing from monopolizing any of said physical CPUs and thus from holding up the processing of the LPAR running thereupon.

2. The computer system of claim 1, said dispatcher unit containing a counter managing the number of times each one of said physical CPUs is allocated to shared processing, wherein said dispatcher unit obtains from said guest OS monitoring unit, each time the contents of said counter are to be updated, the state of the LPAR running on the physical CPU that has been allocated to the shared processing and, if said LPAR is in idle state, chooses not to update the contents of said counter.

3. The computer system of claim 2, wherein at least one of said plurality of LPARs is pre-designated as an LPAR primarily dedicated to said shared processing and, when a request for said shared processing arises, said dispatcher unit gives priority of allocation to the one of said physical CPUs that processes said LPAR primarily dedicated to said shared processing or one of the LPARs that are in idle state.

4. The computer system of claim 3, wherein the number of said physical CPUs is smaller than or equal to the number of said LPARs.

5. A method for allocating through the use of a hypervisor a plurality of physical CPUs to a plurality of LPARs and scheduling the execution of shared processing that pertains to all said LPARs, comprising the steps of:

monitoring, with the use of a guest OS monitoring unit, the states of the guest OSes running on said LPARs;

when a request for shared processing arises, giving priority of allocation to the one of said physical CPUs that runs one of said LPARs in idle state as indicated by said guest OS monitoring unit;

referencing a set of counters that manage the number of times each one of said physical CPUs is allocated to shared processing;

allocating to said shared processing the one of said physical CPUs that has the smallest value in said set of counters;

when a timing of updating the contents of said set of counters arrives, obtaining, from said guest OS monitoring unit, the state of the LPAR running on said physical CPU that has been allocated to said shared processing;

if said LPAR is in idle state, not updating the contents of the counter corresponding to said physical CPU; and if said LPAR is not in idle state, updating the contents of the counter corresponding to said physical CPU.

6. A method for allocating through the use of a hypervisor a plurality of physical CPUs to a plurality of LPARs and scheduling the execution of shared processing that pertains to all said LPARs, comprising the steps of:

monitoring, with the use of a guest OS monitoring unit, the states of the guest OSes running on said LPARs;

when a request for shared processing arises, giving priority of allocation to the one of said physical CPUs that runs one of said LPARs in idle state as indicated by said guest OS monitoring unit;

managing priority among shared processing and processing other than shared processing with the use of a set of dispatch priority tables corresponding to said physical CPUs;

upon completion of execution of a part of said shared processing, updating the contents of the one of said dispatch priority tables that corresponds to said part of said shared processing; and referencing a set of counters that manage the number of times each one of said physical CPUs is allocated to shared processing;

allocating to said shared processing the one of said physical CPUs that has the smallest value in said set of counters;

when a timing of updating the contents of said set of counters arrives, obtaining, from said guest OS monitoring unit, the state of the LPAR running on said physical CPU that has been allocated to said shared processing;

if said LPAR is in idle state, not updating the contents of the counter corresponding to said physical CPU; and if said LPAR is not in idle state, updating the contents of the counter corresponding to said physical CPU.

* * * * *